3,458,292
NITROSYL HYDROGEN PYROSULFATE
Giuseppe Ribaldone, Gallarate-Varese, Franco Smai, Novate Milanese, and Carmine Garbuglio, Milan, Italy, assignors to Società Edison, Milan, Italy, a corporation of Italy
No Drawing. Filed June 16, 1964, Ser. No. 375,621
Claims priority, application Italy, July 8, 1963, 14,085/63
Int. Cl. C01b 21/54, 21/06; C01c 1/20
U.S. Cl. 23—357       1 Claims

ABSTRACT OF THE DISCLOSURE

Nitrosyl hydrogen pyrosulfate having substantially the empirical formula $HNS_2O_8$ and the apparent structural formula $NO—HS_2O_7$, characterized by a melting point substantially in the range 114° to 116° C., stability at elevated temperatures up to about 200° C., a white crystalline appearance in a pure state, strong hydroscopicity, decomposition in the presence of water to nitrogen oxides and sulfuric acid, solubility in concentrated sulfuric acid, insolubility in nonhydroxylated organic solvents, suitability for use in diazotization, nitrosation and oximation reactions, and an analysis in terms of NO and $SO_4$ of substantially 14% by weight NO and 93% by weight $SO_4$.

---

Our present invention relates to a new inorganic chemical entity containing the nitrosyl (NO) group and, more particularly, to a new composition of matter suitable for use in diazotization, nitrosation, oximation and other chemical reactions normally attributed to the nitrosyl group.

We have discovered a unique chemical entity having the empirical formula $HNS_2O_8$ which, to all indications, contains a nitrosyl group and is characterized by its ability to enter into chemical reactions as a source of nitrosonium ion in the manner of such substances as nitrosyl chloride and nitrosyl hydrogen sulfate, although different in major respects from these compounds. The new chemical compound of the present invention can be substituted for nitrosyl hydrogen sulfate and nitrosyl chloride in chemical reactions making use of same. In fact, the new compound of the present invention is particularly suitable as a reagent for all reactions which can exploit the reactivity of the NO group.

It is, therefore, the principle of the present invention to provide a new chemical entity containing a nitrosyl group and useful for the purposes indicated above.

A further object of the present invention is to provide an inorganic nitrosyl compound of the character described with high thermal stability and suitable for use under severe reaction conditions (e.g. high temperatures and the presence of substances tending to decompose conventional nitrosyl compounds).

As previously indicated, the compound or chemical entity falling within the scope of the present invention has been found to have essentially the empirical formula $HNS_2O_8$ and has the apparent structural formula $NO—HS_2O_7$, i.e. possesses a reactive nitrosyl group in combination with the structure normally deemed to constitute a pyrosulfate group. The product can be used as a substitute for a nitrite in the diazotization of organic compounds—e.g. primarily aromatic amines, as a nitrosating agent—in reaction with secondary aromatic amines, or as an oximating agent—whereby the nitrosyl group can be added to a carbonyl compound; all of these reactions are given by way of example of the utility of the new product which constitutes an excellent source of nitrosonium ion.

The chemical entity of the present invention is considered to be a compound which, by analogy with other nitrosyl compounds, will be identified as "nitrosyl hydrogen pyrosulfate" for the purposes of the present disclosure, and is characterized by a high thermal stability; in fact, the product can be heated to temperatures up to about 200° C. without appreciable decomposition or elimination of the introsyl group as a gaseous nitrogen oxide. Cooling of the melted product again produces the chemical entity without any observable variation either in the empirical or structural formula.

The product is characterized by a melting point substantially in the range 114° to 116° C. in the pure state of the compound and a white, crystalline appearance; it is strongly hydroscopic and decomposes in the presence of water to sulfuric acid and nitrogen oxide. The itrosyl hydrogen pyrosulfate is, moreover, soluble in concentrated sulfuric acid but insoluble in most nonhydroxylated organic solvents. It reacts violently with acetic anhydride, yielding hydrogen cyanide. Heating in the absence of moisture with sodium chloride, gives rise to nitrosyl chloride (NOCl).

Chemical analysis of the product, in terms of NO and $SO_4$ has given, on the average, 14.01% by weight NO and 93.5% by weight $SO_4$, while the percentages calculated for $HNS_2O_8$ are 14.48% NO and 92.75% $SO_4$ respectively; these values agree within the usual limits of purity. It may thus be stated that the new product has a composition of substantially 14% by weight NO and 93% by weight $SO_4$.

In the following table, there is recorded the X-ray diffraction spectrum, in terms of the most intense bands, of the nitrosyl hydrogen pyrosulfate of the present invention. The reticular distance is given in terms of Angstrom units while the relative intensity is that obtained visually. The X-ray diffraction spectrum was obtained using a Debye-Sherrer chamber having a diameter of 114.83 mm. and CuKα radiation. From the data recorded in the table it will be evident that peaks characteristic of both the nitrosyl group and the pyrosulfate group are present so that the product has the theoretical or apparent structural formula: $NO—HS_2O_7$.

TABLE

| Reticular Distance (Angstrom units): | Relative intensity |
|---|---|
| 4.84 | Weak. |
| 4.37 | Strong. |
| 4.21 | Do. |
| 3.95 | Medium. |
| 3.52 | Strong. |
| 3.32 | Medium. |
| 3.25 | Do. |
| 3.13 | Strong. |
| 3.00 | Weak. |
| 2.692 | Medium. |
| 2.386 | Weak. |

The following examples describe the production of nitrosyl hydrogen pyrosulfate, the method of production consituting the subject matter of the commonly assigned, concurrently filed copending application Ser. No. 375,622, entitled Process for Preparing Nitrosyl Pyrosulfate.

EXAMPLE I

Sulfur trioxide and nitrosyl hydrogen sulfate are reacted with vigorous stirring in an externally cooled distillation flask. The sulfur trioxide and nitrosyl hydrogen sulfate are present in substantially equimolar quantities. After standing for 12 hours, the reaction mass was finely ground in a dry box and subjected to mild heating (60° to 70° C.) at reduced pressure (10 mm. Hg) until constant weight was attained and any excess sulfur trioxide was eliminated. The yield calculated on the basis of $NOHS_2O_7$ was about 98%. The product obtained is a white crystalline solid melting at 114° C. to 116° C.; in admixture with nitrosyl hydrogen sulfate, it melts at ·50 to 53° C. Analysis of the product yielded 14.01% by weight NO and 93.5% by weight $SO_4$.

EXAMPLE II

Chlorosulfonic acid and nitrosyl hydrogen sulfate, in equimolar quantities, are reacted with mild heating (30 to 40° C.) under reduced pressure (3 mm. Hg) until evolution of hydrogen chloride is complete. The resulting white crystalline substance is identical to that obtained in Example I and melts in the temperature range of 114° to 116° C. The product was substituted for nitrosyl hydrogen sulfate, nitrosyl chloride and nitrites in diazotization, nitrozation and oximation reactions and found to be effective substitute for these sources of nitrosonium ion. The X-ray spectrum was that given in the table.

What is claimed is:
1. As a new chemical entity, nitrosyl hydrogen pyrosulfate having substantially the empirical formula $HNS_2O_8$ and the apparent structural formula $NO-HS_2O_7$, characterized by a melting point substantially in the range 114° to 116° C., stability at elevated temperatures up to about 200° C., a white crystalline appearance in a pure state, strong hydroscopicity, decomposition in the presence of water to nitrogen oxides and sulfuric acid, solubility in concentrated sulfuric acid, insolubility in nonhydroxylated organic solvents, suitability for use in diazotization, nitrosation and oximation reactions, an analysis in terms of NO and $SO_4$ of substantally 14% by weight NO and 93% by weight $SO_4$, and an X-ray spectrum with visually measured intensity using CuKα radiation in a Debye-Sherrer chamber substantially as indicated in the following table:

TABLE

| Reticular Distance (Angstrom units) | Relative intensity |
|---|---|
| 4.84 | Weak. |
| 4.37 | Strong. |
| 4.21 | Do. |
| 3.95 | Medium. |
| 4.52 | Strong. |
| 3.32 | Medium. |
| 3.25 | Do. |
| 3.13 | Strong. |
| 3.00 | Weak. |
| 2.692 | Medium. |
| 2.386 | Weak. |

References Cited

Chemical Abstracts, vol. 50, col. 719 (1956).

Goodard et al., "Journal of The Chemical Society," pp. 2564–2569 (1950).

Mellor, "Comprehensive Treatise On Inorganic and Theoretical Chemistry," 1928, vol. 8, p. 700.

OSCAR R. VERTIZ, Primary Examiner

HOKE S. MILLER, Assistant Examiner